United States Patent [19]
Milojevic

[11] Patent Number: 5,846,303
[45] Date of Patent: Dec. 8, 1998

[54] SCRUBBER FOR CLEANING EXHAUST AIR CONTAMINATED WITH PAINT PARTICLES

[75] Inventor: Dragoslav Milojevic, Butzbach, Germany

[73] Assignee: ABB Fläkt AB, Stockholm, Sweden

[21] Appl. No.: 793,318

[22] PCT Filed: Sep. 5, 1995

[86] PCT No.: PCT/EP95/03489

§ 371 Date: May 16, 1997

§ 102(e) Date: May 16, 1997

[87] PCT Pub. No.: WO96/07485

PCT Pub. Date: Mar. 14, 1996

[30] Foreign Application Priority Data

Sep. 7, 1994 [DE] Germany .......................... 44 31 893.6

[51] Int. Cl.⁶ .................................................. B01D 47/10
[52] U.S. Cl. .................... 96/323; 55/DIG. 46; 96/324; 96/327
[58] Field of Search .............................. 55/DIG. 46, 240, 55/241, 223, 220, 276, 238, 249; 95/157, 150, 216, 217; 96/322, 324, 323, 327

[56] References Cited

U.S. PATENT DOCUMENTS

| | | | |
|---|---|---|---|
| 2,906,511 | 5/1959 | Umbright et al. ........................ 261/24 |
| 3,168,030 | 2/1965 | Wilhelmsson et al. ............ 55/DIG. 46 |
| 3,795,093 | 3/1974 | Gerhard et al. ........................ 55/238 |
| 4,045,524 | 8/1977 | Bornert .................................. 55/240 |
| 4,220,078 | 9/1980 | Walker et al. ........................ 55/240 |
| 4,238,012 | 12/1980 | Telchuk, Jr. et al. .................. 55/240 |
| 4,257,784 | 3/1981 | Gebhard et al. .................. 55/DIG. 46 |
| 4,299,602 | 11/1981 | Cordier et al. .................... 55/DIG. 46 |
| 4,345,921 | 8/1982 | Gustavsson et al. .............. 55/DIG. 46 |
| 4,350,506 | 9/1982 | Otto .................................. 55/DIG. 46 |
| 4,515,073 | 5/1985 | Dorsch et al. ........................ 55/223 |
| 4,608,064 | 8/1986 | Napadow ............................... 55/238 |
| 4,612,025 | 9/1986 | Sampey ................................ 55/223 |
| 4,643,082 | 2/1987 | Lynham et al. ........................ 55/241 |
| 4,664,060 | 5/1987 | Roberts ................................... 55/240 |
| 4,704,952 | 11/1987 | Johnson et al. .................. 55/DIG. 46 |
| 4,729,775 | 3/1988 | Patte et al. ...................... 55/DIG. 46 |
| 4,732,589 | 3/1988 | Parslow, Jr. ........................ 55/241 |
| 4,848,215 | 7/1989 | Morioka et al. ........................ 55/241 |
| 4,952,221 | 8/1990 | Morioka ............................. 55/DIG. 46 |
| 5,020,470 | 6/1991 | West et al. ............................ 55/240 |
| 5,100,442 | 3/1992 | Gore et al. ............................. 55/240 |
| 5,147,422 | 9/1992 | Neeley et al. .................... 55/DIG. 46 |
| 5,286,268 | 2/1994 | Watanabe ......................... 55/DIG. 46 |
| 5,336,283 | 8/1994 | Horisawa ............................... 55/240 |
| 5,425,670 | 6/1995 | Josefsson ......................... 55/DIG. 46 |

FOREIGN PATENT DOCUMENTS

| | | | |
|---|---|---|---|
| 2316855 | 10/1974 | Germany . |
| 2264859 | 4/1975 | Germany ............................... 55/240 |
| 3317230 | 7/1992 | Germany . |
| 4303752 | 8/1994 | Germany . |
| 4303753 | 8/1994 | Germany . |
| 619381 | 9/1980 | Switzerland ................... 55/DIG. 46 |
| 2040721 | 9/1980 | United Kingdom ............ 55/DIG. 46 |
| 2110952 | 6/1983 | United Kingdom . |
| 2119280 | 11/1983 | United Kingdom ................... 55/241 |
| 2217225 | 10/1989 | United Kingdom . |

*Primary Examiner*—Duane S. Smith
*Attorney, Agent, or Firm*—Dilworth & Barrese

[57] ABSTRACT

The invention concerns a scrubber for cleaning work area exhaust air polluted with particles, in particular exhaust air containing particles of paint from a paint spray booth. The scrubber has a flow duct (5), defined in cross section by two opposite duct walls (7). The flow duct (5) includes an inlet region (4) into which the polluted exhaust air flows and into which a fluid (16), running along the duct walls (7), is introduced. The flow duct (5) terminates downstream in an outlet nozzle (3) which runs, transversely to the general flow-in direction (18), into the inlet region (4) and is formed between an upper (8) and a lower (9) duct wall section. A guide wall (2), which has at least one curved portion, tangentially adjoins the upper duct wall section (8), downstream of the outlet nozzle (3).

21 Claims, 1 Drawing Sheet

SCRUBBER FOR CLEANING EXHAUST AIR CONTAMINATED WITH PAINT PARTICLES

BACKGROUND OF THE INVENTION

The invention relates to a scrubber for cleaning work-area exhaust air polluted with particles, and in particular for cleaning exhaust air containing particles of paint from a spray painting booth, according to the preamble of claim 1.

In such conventional scrubbers, which are arranged e.g. beneath a spray painting booth floor grid, the exhaust air is supplied to an inlet region of a flow duct. Inside the flow duct in which the flow parameters such as speed and pressure are controlled in a known manner by a corresponding cross-sectional design, the flow is then deflected in a direction transverse to the original general flow-in direction in the inlet region. The flow is then supplied to an outlet nozzle where the exhaust air is mixed with a fluid which, running along the duct walls, is introduced into the flow duct. An abrupt constriction of the cross section is usually provided at the outlet nozzle so that the exhaust air, charged with e.g. paint particles, is thoroughly mixed with the fluid. The particles present in the exhaust air, such as particles of paint or droplets of fluid, are deposited on one another so that they can be separated from the exhaust air. For this purpose, the outlet nozzle merges into a chamber in which a fluid bath is located.

In conventional scrubbers, an impact wall, against which a large part of the mixture of exhaust air, fluid and agglomerated particles is hurled before the fluid and particles run along the impact wall into the fluid bath, is arranged in this chamber at a distance opposite the outlet nozzle. When the mixture emerging from the outlet nozzle impacts against the impact wall, a considerable and undesirable amount of foam is, however, produced, particularly if foam-producing constituents are present in the fluid introduced into the flow duct.

The invention is therefore based on the technical problem of creating a scrubber in which foaming is reduced.

SUMMARY OF THE INVENTION

This problem is solved according to the invention by a scrubber comprising the features of a scrubber for cleaning work-area exhaust air polluted with particles, particularly for cleaning exhaust air containing particles of paint from a spray painting booth, comprising a flow duct defined in cross section by two opposite duct walls, the flow duct having an inlet region into which the polluted air flows and into which a fluid running along the duct walls, is introduced, and the flow duct terminating downstream in an outlet nozzle running into the inlet region transversely to the general flow-in direction and being formed between an upper and a lower duct wall portion, wherein a guide wall having in its course at least one curved portion tangentially adjoins the upper duct wall portion downstream of the outlet nozzle.

According to the invention a guide wall tangentially adjoins the upper duct wall section of the outlet nozzle in the region of the scrubber located downstream of the outlet nozzle. As a result, the mixture leaving the outlet nozzle flows tangentially along the guide wall. At least one curved portion, with which the mixture of exhaust air, fluid and agglomerated particles emerging from the outlet nozzle can be diverted into a desired direction, e.g. into a fluid bath located below the outlet nozzle, is further provided according to the invention in the course of the guide wall.

The guide wall according to the invention enables an advantageous direction and guidance of the mixture of exhaust air, fluid and particles immediately adjoining the emergence of flow from the outlet nozzle. The tangential continuation of the outlet nozzle's upper duct wall section allows the guide wall to adapt to an optimum extent to the course of flow. This prevents the emergent mixture from impacting a wall—which would happen in the case of a conventional impact wall at a steep angle—which causes a substantial amount of foam to form. In the solution according to the invention, the mixture, after leaving the outlet nozzle, hits the tangentially adjoining guide wall at most at a very oblique angle.

The curved portion provided according to the invention in the further course of the guide wall on the one hand gently-deflects the mixture of exhaust air, fluid and particles into the desired direction and effects on the other hand a phase separation between the solid and liquid components and the gaseous components of the flow mixture. This phase separation is the result of the centrifugal forces which act upon the flow mixture when passing the curved portion of the guide wall. On account of the differing physical density of the mixture's constituents, the heavier components, i.e. the solid particles and liquid components, are separated from the lighter constituents, i.e. the gaseous components.

This separation by centrifugal force along the guide wall's curved portion also reduces foaming. There is also the advantage that the foam that is nevertheless produced is separated by the described effect of the centrifugal forces, with the result that when the flow reaches a fluid bath after passing the guide wall, the foam is already largely separate from the fluid and can be separated comparatively easily from the fluid bath.

The curved portion of the guide wall is preferably arcuate in cross section. Other favorable embodiments consist in designing the curved portion in terms of the cross section as a circular portion, parabolic portion, hyperbolic portion or elliptical portion.

Further beneficial embodiments consist in compositely designing the curved portion of the guide wall in terms of the cross section from straight sub-portions or compositely designing the curved portion in terms of the cross section from sub-portions that have different curvatures.

In expedient embodiments, the curved portion of the guide wall can either directly adjoin the upper duct wall section of the outlet nozzle or the guide wall may comprise a cross-sectionally straight portion between the upper duct wall section of the outlet nozzle and the curved portion.

The various aforementioned embodiments can be used to adapt the guide wall provided according to the invention to the specified spatial conditions. A corresponding geometrical course of the guide wall means that the flow mixture can be guided from its emergence from the outlet nozzle right into a fluid bath. In consequence, the downstream end of the guide wall is preferably at the height of or located below the fluid level of a fluid bath. This produces a continuous gentle guidance of the flow mixture between the outlet nozzle and fluid bath, with there being a decrease in foaming on account of the tangential flow towards the guide wall and because of the separation by centrifugal force of the different phases in the curved portion of the guide wall.

In a preferred embodiment, the guide wall's curved portion has a concave region which substantially faces an exhaust-air region situated below the outlet nozzle. In this way, the concave region of the guide wall forms a reflector portion that reflects the noise generated in the outlet nozzle area mainly into the exhaust-air region situated below the outlet nozzle. This causes the noise generated in the outlet nozzle area not to be directed back into the nozzle from where it may be directed into the work area above the scrubber; instead the noise is directed into a harmless area below the outlet nozzle from where the noise can be diverted by means of further measures. In this way, the scrubber according to the invention advantageously contributes toward reducing the noise level prevalent in the work area above the scrubber, thereby creating more tolerable working conditions for the personnel.

The curved portion's concave region may act not only as a reflector portion but also as a concentrator portion, thus concentrating and guiding the noise emanating from the nozzle area into a desired direction for further harmless removal.

The scrubber according to the invention therefore causes-less foaming than conventional scrubbers in which the content of foam or gas bubbles in the fluid bath is as much as app. 50%. The scrubber according to the invention also causes the noise generated in the nozzle area to resound toward the exhaust-air duct where it is harmlessly removed, and not back into the nozzle from where it might reach the work area. Finally, the centrifugal forces taking effect in the scrubber according to the invention bring about an advantageous phase separation of those foam bubbles which are nevertheless produced from the remaining solid and liquid flow constituents.

BRIEF DESCRIPTION OF THE DRAWING

An exemplary embodiment of the invention will now be explained in greater detail by means of the attached drawing.

DESCRIPTION OF THE PREFERRED EMBODIMENT

Figure 1:
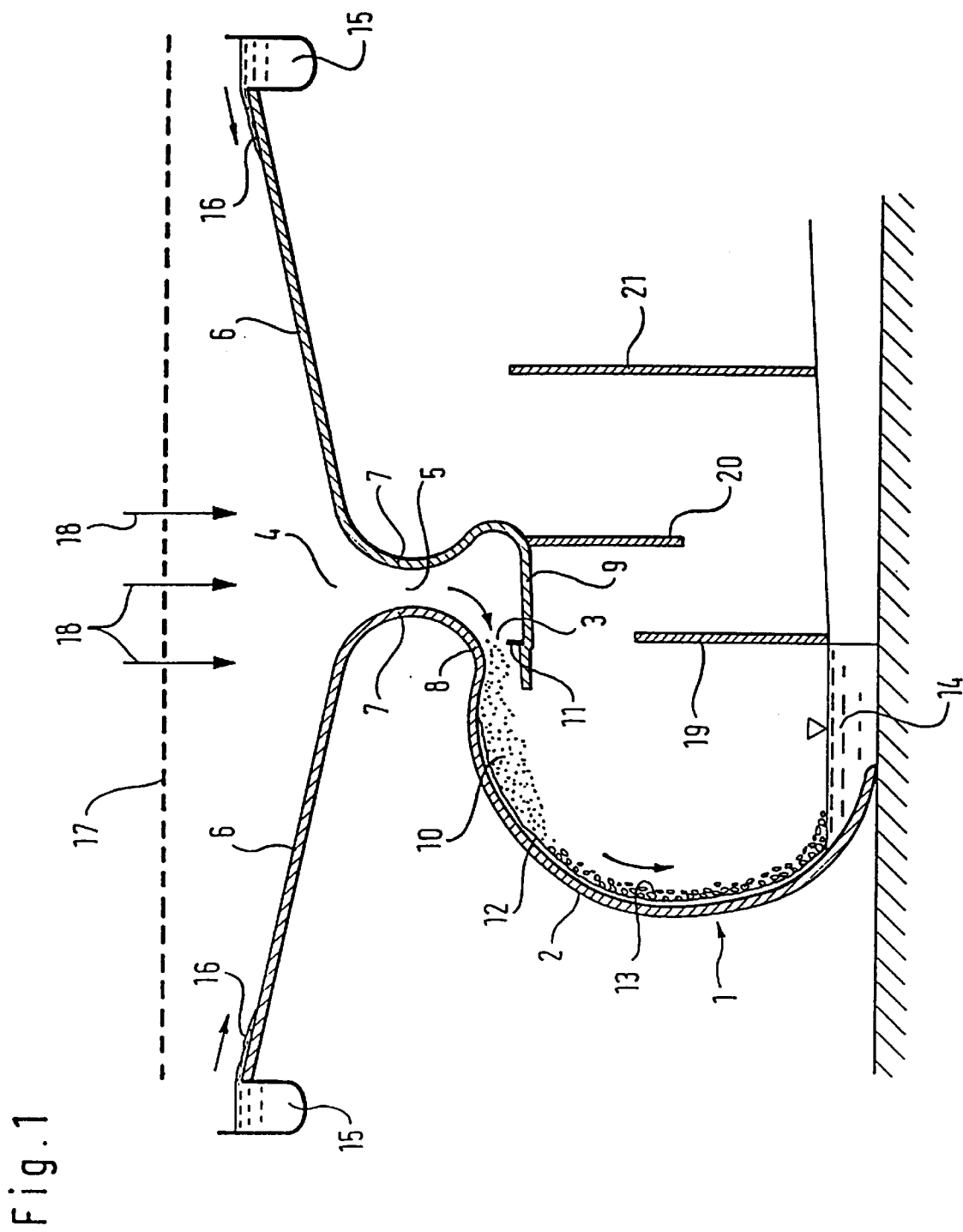
FIG. 1 shows in cross section an embodiment of the scrubber according to the invention.

FIG. 1 shows a scrubber arranged below a spray painting booth (not illustrated). The exhaust air charged with particles of paint from the spray painting booth flows through a base grid 17 in a substantially vertical flow-in direction, illustrated by arrows 18, into the inlet region 4 of the scrubber 1.

The funnel-shaped inlet region 4 is formed by conveying walls 6. An overflow reservoir 15 containing a fluid is respectively arranged at the free ends of the two conveying walls 6. This fluid may for example be water that is optionally provided with soapy or other additives. A fluid film 16, running along the conveying walls 6, is introduced into the scrubber from the overflow reservoirs 15.

A flow duct 5 defined in cross section by two opposite duct walls 7 adjoins the inlet region 4. Across its entire length, i.e. in the direction perpendicular to the plane of projection, the flow duct 7 has a constant cross section. The flow duct 5 is arranged downstream into a region with a decreasing cross section, an adjoining expansion region and a deflection region in which the flow is deflected from its original general flow-in direction according to arrows 18 into a direction transverse thereto. Finally, the flow duct 5 merges into an outlet nozzle 3 that is formed between an upper duct wall portion 8 and a lower duct wall portion 9. An abrupt cross-sectional reduction 11 is provided at the outlet cross section of the outlet nozzle 3 at the lower duct wall portion 9.

A guide wall 2 directly tangentially adjoins the upper duct wall portion 8 of the outlet nozzle 3 at the height of the abrupt cross-sectional reduction 11, i.e. at the nozzle's outlet cross section. The guide wall 2 is continued in a continuously curved portion which finally merges into a fluid bath 14. The free end of the guide wall 2 dips into the fluid level of the fluid bath 14. An exhaust-air region defined by guide surfaces 19, 20, 21 and making it possible to separate droplets is provided between the lower duct wall portion 9 of the outlet nozzle 3 and the fluid bath 14, the fluid level of which is below the outlet nozzle.

The function of the scrubber depicted in FIG. 1 will now be explained.

The exhaust air charged with particles of paint and flowing from the spray painting booth according to arrows 18 is supplied via the inlet region 4 to the flow duct 5 where the exhaust air charged with paint particles passes the various regions of the flow duct 5 as far as the outlet nozzle 3. The fluid films 16 introduced into the inlet region 4 run along the duct walls 7, thus likewise reaching the area of the outlet nozzle 3 where the abrupt cross-sectional reduction 11 causes the exhaust air charged with particles of paint to be turbulently mixed with the fluid introduced into the flow duct. This homogeneous mixture of the fluid droplets with the exhaust air and the particles of paint contained therein causes the paint particles and fluid droplets to accumulate on each other and agglomerate, enabling them to be subsequently eliminated.

In the further course of flow, the resultant mixture 10 of fluid droplets, exhaust air and paint particles does not, as is the case with conventional scrubbers, impact against an impact wall from which the fluid droplets violently spray off while forming a substantial amount of foam; instead, the mixture 10 is gently led to the tangentially adjoining guide wall 2 in the area after the outlet nozzle 3. Since the mixture flows toward the guide wall 2 at most at a very oblique angle, the fluid droplets are largely prevented from spraying away from the guide wall 2 and the fluid film 12 forming thereon, thus reducing foaming.

The arcuately curved course of portion of the guide wall 2 causes centrifugal forces to act upon the mixture 10 that runs along the guide wall 2 in the direction of the arrow, so that the heavier particles of paint and the droplets of fluid accumulate in an area, on the outside of the curve, of the arcuately curved portion, while the lighter gas bubbles accumulate in an area on the inside of the curve. This phase separation, due to the differing physical density of the constituents of the mixture 10, therefore produces, at the curved portion of the guide wall 2, a fluid film 12 on the outside of the curve and a foam bubble film 13 on the inside of the curve. That foam which despite the occurrence of phase separation has not yet dissolved while passing along the curved portion of the guide wall 2 is subsequently present on the surface of the fluid bath 14, separated from the fluid.

The noise generated in the area of the outlet nozzle 3 is further reflected from the curved portion of the guide wall 2, the concave side of which portion is essentially directed at the exhaust-air region 19, 20, 21 below the outlet nozzle 3, in a harmless manner toward this exhaust-air region. The arcuately curved portion therefore acts as a reflector and concentrator for the emergent nozzle noise. Since the noise is chiefly reflected away from the nozzle, the noise is prevented from re-entering the nozzle from where it might reach the work area above the scrubber.

I claim:

1. A scrubber for cleaning work-area exhaust air polluted with particles, comprising a flow duct (5) defined in cross section by two opposite duct walls (7), said flow duct having an inlet region (4) into which the polluted air flows and into which a fluid (16), running along said duct walls (7), is introduced, and said flow duct (5) terminating downstream in an outlet nozzle (3) running into said inlet region (4) transversely to the general flow-in direction (18) and being formed between an upper (8) and a lower (9) duct wall portion, wherein an abrupt cross-sectional reduction (11) is provided in the region of the outlet cross section of said outlet nozzle (3), and a guide wall (2) having in its course at least one curved portion tangentially adjoins said upper duct wall portion (8) downstream of said outlet nozzle (3).

2. A scrubber according to claim 1, wherein said curved portion of said guide wall (2) is arcuate in cross section.

3. A scrubber according to claim 1, wherein said curved portion of said guide wall (2) is a circular portion in cross section.

4. A scrubber according to claim 1, wherein said curved portion of said guide wall (2) is a parabolic, hyperbolic or elliptical portion in cross section.

5. A scrubber according to claim 1, wherein said curved portion of said guide wall (2) is formed in cross section from straight sub-portions.

6. A scrubber according to claim 1, wherein said curved portion of said guide wall (2) is formed in cross section from sub-portions having different curvatures.

7. A scrubber according to claim 1, wherein said curved portion of said guide wall (2) directly adjoins said upper duct wall portion (8) of said outlet nozzle (3).

8. A scrubber according to claim 1, wherein said guide wall (2) has a straight portion between said upper duct wall portion (8) of said outlet nozzle (3) and said curved portion of said guide wall.

9. A scrubber according to claim 1, wherein the downstream end of said guide wall (2) is at the height of or situated below the fluid level of a fluid bath (14).

10. A scrubber according to claim 1, wherein said curved portion of said guide wall (2) has a concave region substantially facing an exhaust-air region (19, 20, 21) located below said outlet nozzle (3).

11. A scrubber according to claim 2, wherein said curved portion of said guide wall (2) is a circular portion in cross section.

12. A scrubber according to claim 2, wherein said curved portion of said guide wall (2) is a parabolic, hyperbolic or elliptical portion in cross section.

13. A scrubber according to claim 2, wherein said curved portion of said guide wall (2) is formed in cross section from straight sub-portions.

14. A scrubber according to claim 2, wherein said curved portion of said guide wall (2) is formed in cross section from sub-portions having different curvatures.

15. A scrubber according to claim 2, wherein said curved portion of said guide wall (2) directly adjoins said upper duct wall portion (8) of said outlet nozzle (3).

16. A scrubber according to claim 2, wherein said guide wall (2) has a straight portion between said upper duct wall portion (8) of said outlet nozzle (3) and said curved portion of said guide wall (2).

17. A scrubber according to claim 2, wherein the downstream end of said guide wall (2) is at the height of or situated below the fluid level of a fluid bath (14).

18. A scrubber according to claim 2, wherein said curved portion of said guide wall (2) has a concave region substantially facing an exhaust-air region (19, 20, 21) located below said outlet nozzle (3).

19. A scrubber according to claim 3, wherein said curved portion of said guide wall (2) directly adjoins said upper duct wall portion (8) of said outlet nozzle (3).

20. A scrubber according to claim 3, wherein said guide wall (2) has a straight portion between said upper duct wall portion (8) of said outlet nozzle (3) and said curved portion of said guide wall (2).

21. A scrubber according to claim 1, structured and arranged for cleaning exhaust air containing particles of paint from a spray painting booth.

* * * * *